Nov. 5, 1963  B. E. McCLANAHAN  3,109,414
WATER HEATING SYSTEM
Filed Nov. 14, 1961
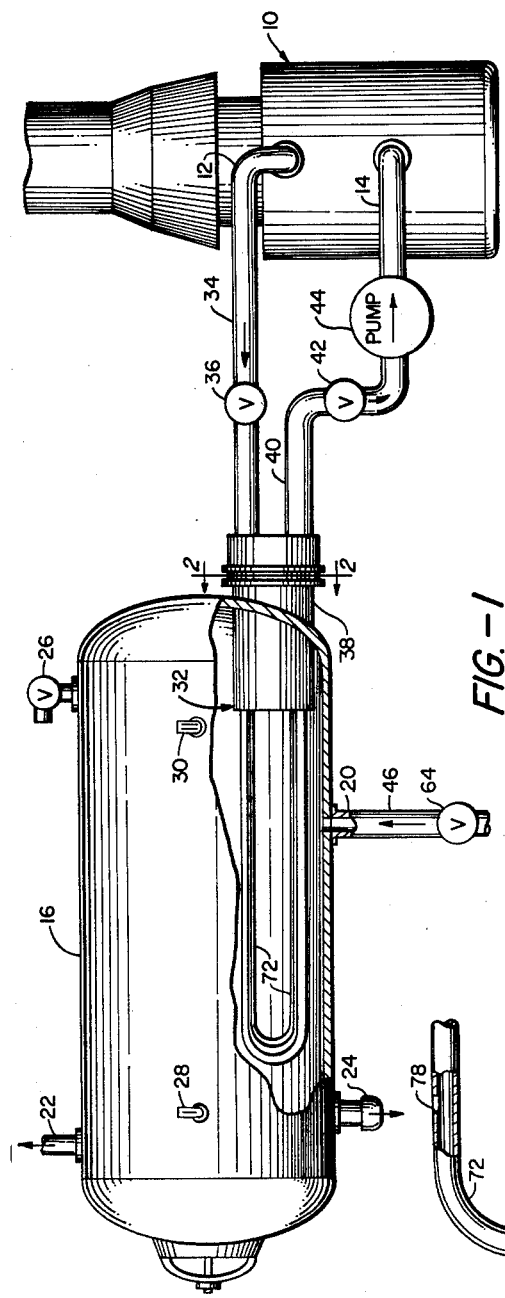
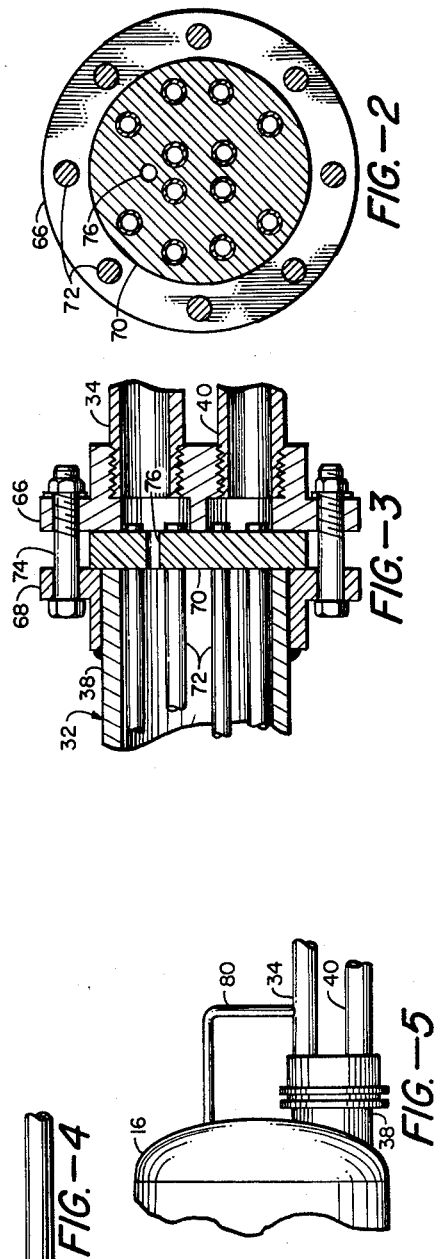
INVENTOR.
BERNARD E. McCLANAHAN
BY Fraser and Bogucki
ATTORNEYS 3,109,414
WATER HEATING SYSTEM
Bernard E. McClanahan, Whittier, Calif., assignor to Ace
Tank and Heater Company, a corporation of California
Filed Nov. 14, 1961, Ser. No. 152,288
2 Claims. (Cl. 122—33)

This invention relates to water heating systems and more particularly to hot water storage and heating apparatus which utilize a water heater separate from the water storage tank.

Currently, many of the larger hot water heating and storage systems have a separate water heater with circulation lines connected thereto and passing through a water storage tank for heat exchange purposes. Both the water heater and the storage tank, being parts of independent closed systems, require separate expansion chambers, pressure relief valves, and duplicate connections to a source of water. In such arrangements, the water heater and its circulation lines leading to the hot water storage tank, including what are called the water tubes mounted inside the tank, may be designated the primary heating system. The storage tank and the hot water distribution lines may be designated the secondary heating system. In operation, heat is transferred from the heat source within the water heater to the primary system within which it is circulated to the water tube portion within the hot water storage tank. There the heat is exchanged from the hot water of the primary system through the water tube walls to heat the water of the secondary system to provide a reservoir of hot water which may be thermostatically controlled at a selected temperature for use as desired. The utilization of separate primary and secondary systems in this fashion reduces the buildup of mineral deposits from the heated water and practically eliminates such deposits within the heater itself.

In such systems as are known of the type described, satisfactory safe operation requires that an expansion tank be included as part of the primary heating system in order to accommodate the expansion of the water as it is heated. The expansion tank includes a substantial volume of air when the system is cold and utilizes this air as a cushion to accept the increase in volume of the water as the system is heated. In addition, an independent connection must be supplied to a source of water which may be used to fill the primary heating system when it is initially put into operation and also to supply make-up water to compensate for any water losses which may occur. Finally, because the system is a closed system, a safety relief valve must be incorporated to protect the system in the event that excess pressure or temperature is developed therein.

Similar equipment, i.e. a safety relief valve and a connection to a water source (and occasionally an expansion tank), is also supplied in conjunction with the water storage tank of the secondary heating system. It is obvious that the requirement for such equipment in both the primary and secondary heating systems results in a duplication of equipment and function which adds to the cost of the over-all water heating system both in installation and in maintenance, as well as resulting in a more complicated system which requires additional space for its operation.

It is therefore an object of this invention to provide an improved water heating system of the type described hereinabove.

It is a further object of this invention to provide a water heating system which is simpler and less costly to install and maintain than systems which are presently known.

It is an additional object of the invention to eliminate the duplication of expansion tank and relief valve equipment presently encountered in known water heating systems of the type described.

It is another object of the present invention to provide an arrangement for eliminating a duplication of pressure and volume compensating devices in a hot water heating system which may be adapted to existing heating systems without elaborate alterations.

It is still another object of the present invention to provide a hot water heating system in which the storage tank and the water heater both use the same pressure and volume compensating devices which may be economically installed during the assembly or manufacture of the system.

In brief, one particular arrangement in accordance with the present invention provides a hot water system comprising a storage tank and a hot water heater which may be positioned adjacent to the tank and having circulating tubes mounted from the heater through the storage tank with a return line reentering the heater. A water circulating device such as a pump circulates water throughout the primary system in order that heat may be transferred from the heater to the secondary system including the water storage tank.

In accordance with the invention, means for equalizing pressure by the transfer of water between the primary and secondary systems are included. By virtue of this advantageous arrangement, the auxiliary equipment such as expansion tanks, water source connections, and relief valves formerly required in conjunction with the primary system may be eliminated, thereby reducing the cost and size of the over-all water heating system.

One specific arrangement of the present invention provides a perforation or small aperture through the water tube plate which serves to position the water tubes within the hot water storage tank. Water is thereby permitted to flow between the primary and secondary systems as required to supply make-up water to the primary system or to allow for the expansion of water in the primary system. The aperture thus provided is small enough that there is an insignificant circulation of water between the two systems except as may be required for the needs described. Thus the advantages of having separate primary and secondary hot water systems are preserved without the drawback of requiring duplicate equipment as with previously known systems.

In another arrangement of the invention, a small conduit is connected between the water storage tank and a circulating line of the primary system connected to the hot water heater. In still another arrangement of the invention one of the water tubes, which comprises a portion of the circulating line within the interior of the storage tank, has a perforation allowing water to flow as needed between the circulating line and the storage tank.

The present invention may be adapted to hot water heating and storage systems presently in existence without extreme alterations of the equipment. It is customary in the trade to fabricate water storage tanks having heating units which may be removed from time to time in order to clean the accumulated mineral deposits from the water tubes. With such a structural arrangement the water tube plate supporting the tubes may be easily removed and a small perforation placed therethrough in order to allow water to be transferred between the storage tank and the water heater. The alternative arrangement of the invention which relates to a perforation in a water tube, rather than in the water tube plate, may also be adapted to existing heating systems. In like manner as described above, a tank heating unit may be removed and a perforation made through one of the water tubes to adapt an existing unit in accordance with the invention. In yet another embodiment of the invention, a conduit may be attached between the storage tank and the circulating line from the water heater. The installations described above demonstrate that existing equipment can be adapted to use the present invention without expensive alteration. In accordance with the present invention, the expansion chamber, relief valve, and make-up water connections formerly associated with the primary heating system may be removed, thus reducing the amount of capital and equipment required for the operation of an over-all water heating and storage system of the type described.

A better understanding of the invention may be had from the following detailed description, taken in conjunction with the accompanying drawing wherein like reference characters designate corresponding parts in the several views in which:

FIG. 1 is a front elevation of a hot water heating and storage system constructed in accordance with the invention;

FIG. 2 is an enlarged end view of the water tube assembly of the arrangement of FIG. 1 showing a water tube plate embodying the present invention as viewed along the line 2—2 looking in the direction of the arrows;

FIG. 3 is an enlarged cross sectional view of a portion of the arrangement of FIG. 1 showing details of construction;

FIG. 4 is a partial side elevation view of an element of the arrangement of FIG. 1 illustrating a second embodiment of the invention; and FIG. 5 is a partial side elevation view of the storage tank of FIG. 1 illustrating yet another embodiment of the invention.

Referring now to FIG. 1, a hot water heater 10 which may be of either the steam or warter boiler type is shown having a hot water outlet 12 attached to the upper portion of the heater 10 and a hot water return or inlet 14 attached to the lower portion thereof. A horizontally disposed hot water storage tank 16 is also shown having a cold water inlet 20 attached to the lower portion of the tank 16 and connected to a source of cold water (not shown). A hot water outlet 22, attached to the upper portion of the tank 16 is provided to supply hot water to various fixtures and appliances (not shown). A drain 24 at the bottom of the tank 16 is provided for draining and for clean out purposes. A relief valve 26 is positioned adjacent the upper portion of the tank 16 to permit the release of water from the tank 16 in the event of the build-up of excessive water pressure or temperature therein. Control components such as a conventional thermometer 28 and a thermostat 30 are shown mounted on the tank 16 to aid in regulating the operation of the hot water heater 10.

The heater outlet 12 is connected to a tank heating unit 32 by a pipe 34 having a regulating valve 36 which may be of the conventional globe valve type. A heating unit collar 38 is fixedly attached to the tank 16, as for example by welding. A pipe 40 interconnects the heating unit 32 and the water heater inlet 14 with a regulating valve 42 interposed there between. Water pump 44, interposed between valve 42 and the water heater inlet 14 circulates water through the heating unit and the heater for the purpose of transferring heat from the heater 10 ultimately to the water in the storage tank 16.

The storage tank 16 receives cold water through an inlet 20 that is connected via a pipe 46 and a valve 64 to a cold water source (not shown). The inlet water is heated within the tank 16 by the transfer of heat from the water tubes 72, part of the heating assembly 32 within the tank 16. The water tubes 72, together with the circulating lines 34, 40 and the water heater 10 comprise the primary heating system. The tank 16 and the lines connected at the inlet 20 and the outlet 22 comprise the secondary heating system.

Particular details of a portion of the system depicted in FIG. 1 are shown in FIGS. 2 and 3 which illustrate one specific embodiment in accordance with the invention. This portion of the system comprises a water tube plate 70 which supports a plurality of U-shaped water tubes 72 positioned and sealed in openings in the plate 70. This assembly of water tubes and the water tube plate is gripped between a pair of flanges 66 and 68 which are held together by a plurality of bolts such as 74. The flange 68 is slipped over the end of the collar 38 and welded thereto. As previously noted, the collar 38 is welded into the tank 16 so that a water tight assembly is maintained when the flanges 66 and 68 are bolted tightly together on opposite sides of the water tube plate 70. By virtue of this arrangement the water tube assembly comprising the water tubes 72 and water tube plate 70 may be removed from the storage tank 16 for cleaning and replacement as may be required without the extensive disassembly of the entire system. The circulating pipes 34 and 40 are threaded into openings in the flanges 66 in order to complete the water circulation path of the primary system in which water flows under the influence of the pump 44 along the pipe 34 into the upper ends of the water tubes 72 and back through the pipe 40 to the heater 10. Continued circulation in this manner transfers heat from the heater 10 to the water in the storage tank 16 of the secondary system.

In accordance with the invention, a small perforation or aperture 76 is provided in the water tube plate 70. The aperture 76 is positioned in such a way that it provides a connection between the primary and secondary systems, thus permitting water to flow between the two. In accordance with the invention, the aperture 76 permits the primary system to receive water from the secondary system as it is needed and further serves to relieve the pressure in the primary system by the flow of water therefrom through the aperture 76 into the secondary system as the water in the primary system becomes heated. By virtue of this arrangement, the necessity for an expansion tank, a relief valve, and a direct connection to a water source is entirely obviated insofar as the primary system is concerned. Thus a simpler, more economical arrangement is provided than has hitherto been available with prior art arrangements. While only one aperture 76 is shown in the water tube plate 70, it will be appreciated that additional apertures may be provided as needed or desired in order to perform adequately the described function of the arrangement in accordance with the invention.

A second specific embodiment of the invention is illustrated in FIG. 4 which represents a portion of a water tube 72. This portion is shown partially cut away in order to depict an aperture 78 formed in the wall of the water tube 72. This arrangement of the invention may be employed instead of or in addition to the arrangement depicted in FIGS. 2 and 3 wherein an aperture 76 is shown within the water tube plate 70.

Still another embodiment of the present invention is shown in FIG. 5 wherein a connection between the primary and secondary systems of the over-all arrangement of FIG. 1 is provided by a conduit 80 connected between the tank 16 and the circulation pipe 34 by suitable fittings. In any event, regardless of which specific arrangement is employed, a passage for water between the primary and secondary systems is provided in order that the auxiliary equipment and connections formerly required in conjunction with the primary system may be eliminated.

While a particular water heating system in accordance with the invention has been shown incorporating the various embodiments of the present invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. An improved hot water heating and storage system which comprises a hot water heater, a hot water storage tank spaced from said heater, closed water circulating pipes connected to said hot water heater, a generally vertical water tube plate releasably connected to said storage tank, one end of each of said circulating pipes being threadably connected to said plate on the side of said plate adjacent said hot water heater, a plurality of water tubes of extended surface area disposed within said storage tank and fixedly connected to said water tube plate, said water tubes communicating with said circulating pipes through said plate, said water tube plate defining at least one aperture extending therethrough in direct communication with the interior of said storage tank and also communicating with at least one of said circulating pipes, said aperture being horizontally disposed substantially throughout the length thereof and spaced from and out of direct communication with said water tubes, whereby water is directly transferable between said storage tank and said circulating pipes through said aperture.

2. An improved hot water heating and storage system whilch comprises a hot water heater, a hot water storage tank spaced from said heater, closed water circulating pipes connected to said water heater, a water tube plate releasably connected to said storage tank, one end of each of said circulating pipes being threadably connected to said plate on the side thereof adjacent said water heater, a plurality of water tubes of extended surface area disposed within said storage tank and fixedly connected to said water tube plate and in communication with said circulating pipes, and a water conduit connected at one end thereof to at least one of said circulating pipes external of said tank and connected at the opposite end thereof directly to said tank, said conduit defining an aperture extending horizontally into said tank and in direct communication with the interior thereof, said conduit and said aperture being out of direct communication with said water tubes.

References Cited in the file of this patent

UNITED STATES PATENTS

| | | |
|---|---|---|
| 1,633,758 | Birtch | June 28, 1927 |
| 1,762,522 | Newell | June 10, 1930 |
| 2,879,749 | Lewy | Mar. 31, 1959 |